Figure 6:
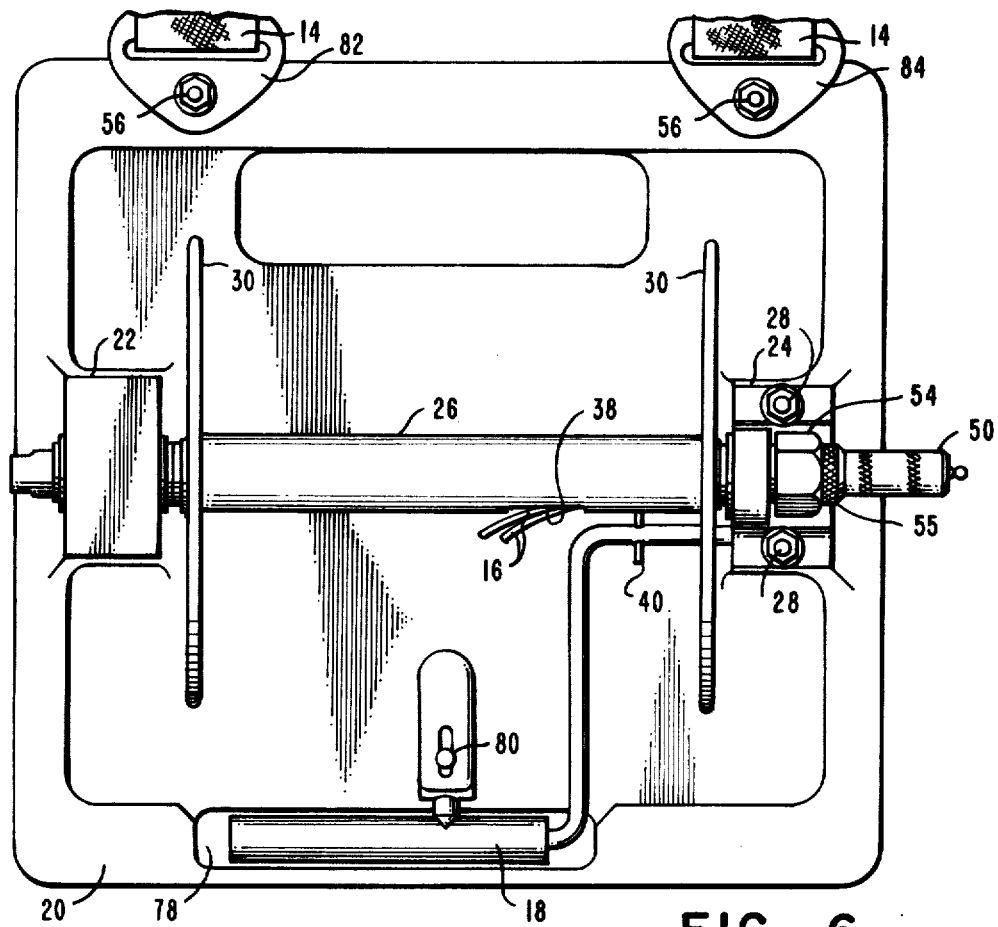

United States Patent
Brower et al.

[15] 3,686,448
[45] Aug. 22, 1972

[54] SAFETY REEL

[72] Inventors: Jerome S. Brower, 1170 Murchison, Pomona, Calif. 91768; Douglas D. Smith, 956 E. Elmorado Court, Ontario, Calif. 91764

[22] Filed: Aug. 6, 1970

[21] Appl. No.: 61,680

[52] U.S. Cl. ..........................191/12.2 R, 191/12 R
[51] Int. Cl. .........................................H02G 11/02
[58] Field of Search..191/12 R, 12.2 R, 12.4, 12.2 A; 242/77

[56] References Cited

UNITED STATES PATENTS

| 2,274,330 | 2/1942 | Hammond | 191/12.2 R |
| 1,921,009 | 8/1933 | Skaggs | 191/12 R |
| 2,089,981 | 8/1937 | Price | 191/12.2 R |
| 184,251 | 11/1876 | Lundberg et al. | 191/12.2 R |
| 1,643,725 | 4/1927 | Price | 191/12.2 R |
| 2,585,070 | 2/1952 | Allard | 191/12.4 |

*Primary Examiner*—Arthur L. La Point
*Assistant Examiner*—D. W. Keen
*Attorney*—Sanford Astor

[57] ABSTRACT

The invention relates to a lightweight portable reel for carrying blasting wire in which the end of the wire is electrically connected internal of the reel axle to a female jack into which a male plug is inserted to act as a shorting plug to prevent accidental firing and in which the other end of the wire is connected to the charge so that the wire need not be cut for connection to the blasting machine.

4 Claims, 7 Drawing Figures

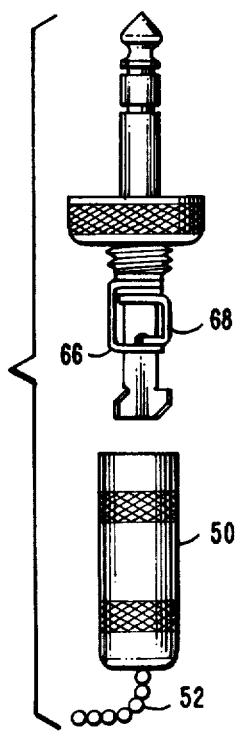
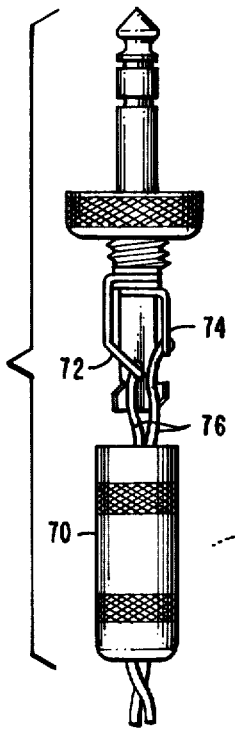
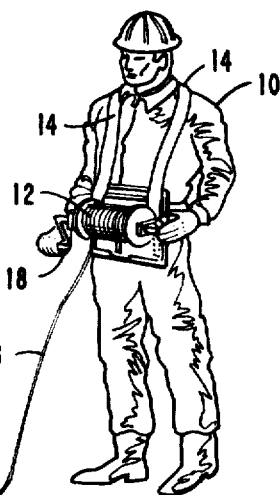
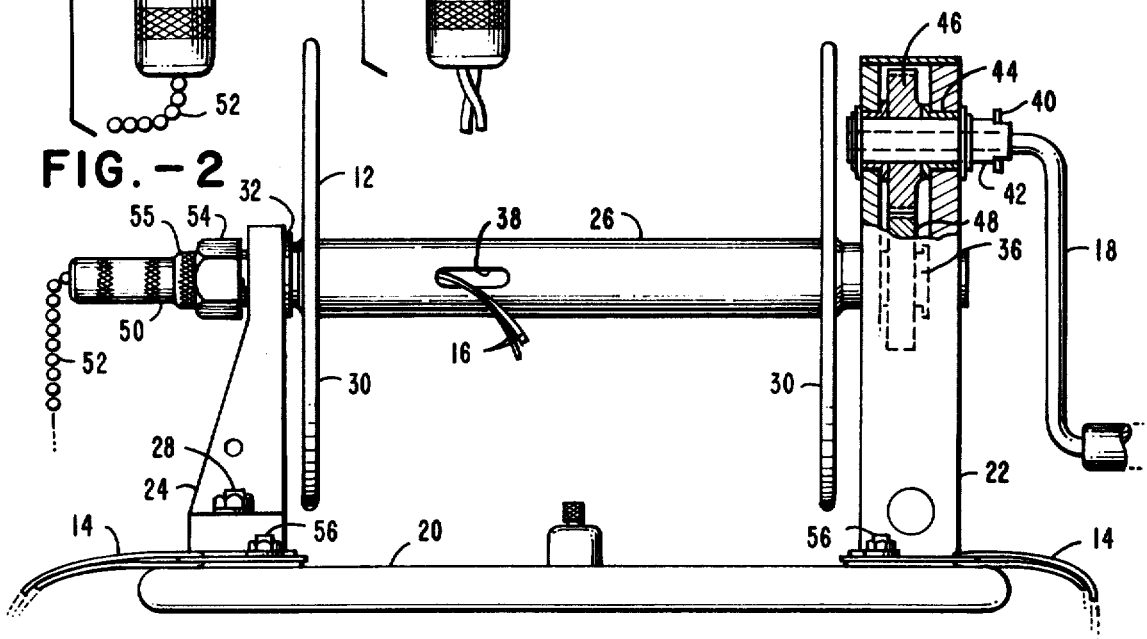

SAFETY REEL

The device of the present invention is a lightweight portable reel for carrying up to, as an example, 1,000 feet of No. 18 gauge or 500 feet of No. 14 gauge solid conductor insulated wire pair. This wire assembly is called the shot line and is used as a part of a blasting circuit. One end of the wire pair is connected through the hollow axle of the reel to a female jack mounted in one end of the axle. Into this female jack are inserted one of the two types of male plugs. One male plug has the internal electrical leads connected together to form an electrical short. Therefore, this is the shorting or safety plug. When constructing blasting circuits the shorting plug is inserted into the jack in the reel axle to short the circuit. The other end of the shot line is connected to the leads from the blasting circuit. This permits a loop check to be made of the complete circuit at the junction of the shot line and the circuit of electric blasting caps. The unique feature of this invention is that the complete shot line can be checked independently, the electrical loop which includes the blasting caps, can be checked independently, and finally the entire circuit can be checked— all safely and from a single point.

The shot line is reeled off as the blaster walks from the point where the explosives are emplaced to the point of safety where he will set off the charge. There is no need to cut the shot line for distances less than the total length of wire carried on the reel, rather the shorting plug is removed and replaced with the firing plug. The total circuit can then be rechecked before attaching the wires from the firing plug to the blasting machine. Once the charge has been detonated, the firing plug is removed and replaced with the shorting plug and the shot line can be wound back onto the reel for reuse.

The present practice is to lay out the shot line, cut off the shot line from the roll, and then splice in the blasting caps after wire has been unwound or unraveled from a spool. After the blasting caps are connected to each other and to the shot line, the terminal ends of the shot line wires are attached to the blasting machine for blasting. The shot line is often carried with the insulation stripped from both ends of the wires to permit rapid hookup. This creates the possibility of an accidental firing by someone making a connection to the blasting machine prior to clearing the shot area. Once the explosives have been detonated, the shot line wires are spliced back to the roll of wire and the shot line rewrapped on a spool.

It is an object of the present invention to provide a blasting wire reel in which the possibility of accidental firings is eliminated. The firing plug is carried in the blaster's pocket until he makes the final hookup to the blasting machine just prior to making the shot. The firing plug is like the "key" and no one else has access to it until he is ready to plug into the shot line. If two men are setting up the blasting charge, one keeps the firing plug in his possession while the other retains the blasting machine providing a cross-check method for insuring safety.

It is a further object of this invention to provide a blasting wire reel in which the wire may be reused time and time again and reeled in for neat and orderly storage.

It is yet a further object of this invention to provide a blasting wire reel which is lightweight and portable.

Some of the objects of the invention having been stated, other objects and features will become apparent from the following detailed description when read in connection with the accompanying drawings, in which:

FIG. 1. is a perspective view of a man using the device of the present invention;

FIG. 2. is a side elevation view of the device of the present invention;

FIG. 3. is an exploded view of the female jack of the present invention;

FIG. 4. is a side elevation view of the safety shorting plug of the present invention;

FIG. 5. is a detailed drawing of the firing plug of this invention;

FIG. 6. is a plan view of the device of the present invention; and

Figure 7:
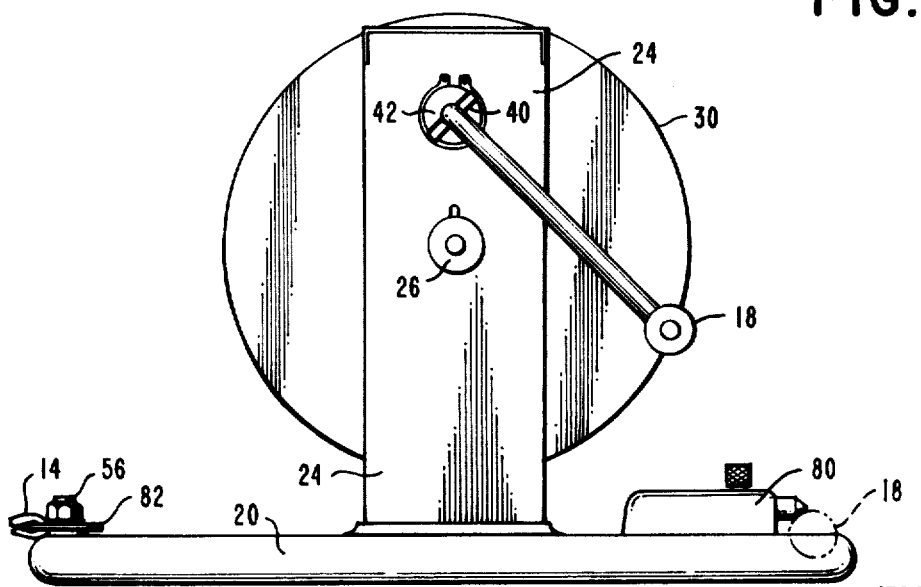

FIG. 7. is a side elevation view of the device of the present invention.

Referring more specifically to the drawings, FIG. 1 shows a man 10 carrying the reel 12 of the present invention which he holds by utilizing a neck or shoulder strap 14. The electrical cable or shot line 16 wound around the reel 12 is unwound and rewound by using handle crank 18.

Referring now to FIG. 2 there is shown the reel 12 which comprises base plate 20 to which there is attached at opposite ends thereof pedestals 22 and 24 which support axle 26. Pedestals 22 and 24 are fixedly attached to base plate 20 by any convenient method such as by bolts 28.

Axle 26 having flanges 30 is cylindrical and hollow and arranged transversely between pedestals 22 and 24 for rotation in bearings 32 and 36.

A slot 38 is provided in axle 26 for insertion of the axle end of wire 16. The two ends of wire 16 are then electrically connected to the female jack shown later, which is held in place internally in axle 26 by the jam nut 54.

Handle 18 having drive pin 40 engages a slot in sleeve 42, thus handle 18 is removable for easier portability of the reel, and may be slipped into operative position when needed.

Bearing 44 engages drive gear 46 so that rotation of handle 18 rotates drive gear 46 which in turn engages axle gear 48. Rotation of handle 18 then effects rotation of axle 26. The gear configuration permits the handle 18 to be rotated even when baseplate 20 is resting on the ground.

A shorting plug 50 which is internally shorted and which is attached to base plate 20 by chain 52 is inserted into the end of axle 26 electrically contacting the ends of wire 16. Plug 50 is internally shorted electrically and thereby acts as a shorting plug when inserted so that the complete circuit is absolutely shorted and prevents an accidental firing of an electric blasing cap which maybe connected to the ends of shot line 16.

Shorting plug 50 is threadably locked to axle 26 by coupling ring 55 which threadably engages the threaded end of the female jack in the axle 26 so that shorting plug 50 is locked into place and cannot fall out during handling of the reel. Recess 29 having a detent spring unit holds shorting plug 50 in place when not in use.

Strap 14 is fixedly attached to base plate 20 by any convenient method such as bolts 56.

FIG. 3 is a detailed drawing showing the electrical connection of the ends of shot line 16 engaging the female jack 58. Female jack 58 haveng cover sleeve 60 fits internal of axle 26 having electrical connectors 62 and 63 to which the ends of shot line 16 are electrically attached and grounded. The shorting plug or firing plug then electrically engages female jack 58 and is held by the coupling ring 55 on the plugs which threadably engages the end of the female jack 58 as stated above.

FIG. 4 is a detailed drawing of male plug 50 which is the shorting plug. Electrical contacts 66 and 68 are joined mechanically and electrically by bending them and soldering them together. Ball chain 52 is attached to male plug 50 and base plate 20.

FIG. 5 is a detailed drawing of male plug 70 which is the firing plug. Electrical contacts 72 and 74 are attached to the ends of the wire 76 to the blasting machine.

FIG. 6 is a top view of the device of the present invention showing the reel in carrying position in which removable handle 18 with drive pin 40 is inserted in slot 78 of base plate 20 and is locked into position by slide lock 80. This provides easy portable carrying of the reel of the present invention without the handle protruding from its operable position.

There is shown in FIG. 6 strap 14 fixedly attached to base plate 20 by buckles 82 and 84 held by bolts 56.

Pedestals 22 and 24 attached by bolts 28 to base place 20 support cylindrical axle 26 having flanges 30, into which shot line 16 is internally connected through slot 38.

Either shorting plug 50 or firing plug 70 is inserted into the end of axle 26 electrically connecting the ends of shot line 16 and either plug 50 or 70 is held in position by coupling ring 55.

FIG. 7 shows an end view of the reel of the present invention with the handle inserted into operable position and drive pin 40 engaged in the slot in sleeve 42.

Pedestal 24 supports axle 26 having flanges 30. Slide lock 80 is fixedly attached to base 20 to hold handle 18 when it is disengaged and placed in the carrying position in base 20.

Strap 14 is held by buckle 82 fixed to based plate 20 by bolt 56.

The reel of the present invention enables blasting crews to construct highly reliable circuits quickly and under totally safe conditions. All guess work is eliminated from determining the reliability of the circuit because complete system can be checked in either direction, by a blasting galvanometer, at any given junction throughout the circuit due to the fact that the circuit is shorted by the shorting plug. The system is absolutely inactivated during rigging and testing.

In order to use the reel of the present invention as shown in FIG. 1 the man straps the reel around his neck, slings over his shoulders, and, with shorting plug 50 inserted, he unreels the shot line from the charge to the position where the blasting machine is to be placed. Shorting plug 50 is then removed and a firing plug 70 is inserted. The firing plug has two lead wires which are then attached to the blasting galvanometer for a final check of the circuit. If the circuit is complete, the lead wire is fixed to the blasting machine. After the blast operation has been performed the firing plug is removed and the shorting plug is replaced in position. The wire may then be reeled back onto the reel to be reused in subsequent blasting operations.

An additional benefit of the reel of the present invention is that there is a constant length of wire regardless of the distance of the blasting machine from the charge. With a constant length of wire for each blasting operation there is no problem of predicting voltage drop due to the length of the wire.

We claim:

1. A reel assembly for electrical cable comprising:
   a. a base plate
   b. a hollow cylindrical axle mounted on said base plate
   c. a set of gears adapted to rotate said axle
   d. a removable crank handle to rotate said gears
   e. a female jack internal of said axle for electrical connection of the ends of said cable
   f. a male shorting plug adapted to electrically contact said female jack wherein said plug is electrically shorted internally
   g. a second male plug adapted to electrically contact said female jack.

2. The assembly of claim 1 wherein said male shorting plug comprises a coupling ring adapted to lock said plug to said axle.

3. The assembly of claim 1 wherein said base plate comprises a plate with a shoulder strap, adapted to allow carrying of said reel.

4. The assembly of claim 3 wherein said plate comprises in addition a carrying slot adapted to hold said crank handle when it is in the carrying position and a slide lock to lock said handle crank in said carrying slot.

* * * * *